United States Patent
Huber et al.

(10) Patent No.: US 9,823,058 B2
(45) Date of Patent: Nov. 21, 2017

(54) DEVICE FOR POSITION DETERMINATION

(71) Applicant: DR. JOHANNES HEIDENHAIN GmbH, Traunreut (DE)

(72) Inventors: Walter Huber, Traunstein (DE); Wolfgang Holzapfel, Obing (DE); Ralph Joerger, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 160 days.

(21) Appl. No.: 14/524,035

(22) Filed: Oct. 27, 2014

(65) Prior Publication Data
US 2015/0116731 A1 Apr. 30, 2015

(30) Foreign Application Priority Data

Oct. 29, 2013 (DE) .................. 10 2013 221 898

(51) Int. Cl.
*G01B 11/02* (2006.01)
*G01B 11/00* (2006.01)
(Continued)

(52) U.S. Cl.
CPC ............ *G01B 11/002* (2013.01); *G01B 11/14* (2013.01); *G01D 5/38* (2013.01)

(58) Field of Classification Search
CPC .. G01B 11/002; G01B 11/14; G01B 2290/30; G01B 9/02015; G01B 9/02016;
(Continued)

(56) References Cited

U.S. PATENT DOCUMENTS 4,606,638 A * 8/1986 Sommargren ......... G01B 11/14
356/492
5,977,539 A 11/1999 Holzapfel et al.
(Continued)

FOREIGN PATENT DOCUMENTS

DE 19748802 A1 5/1998
DE 19908328 A1 8/2000
(Continued)

*Primary Examiner* — Tarifur Chowdhury
*Assistant Examiner* — Jonathon Cook
(74) *Attorney, Agent, or Firm* — Leydig, Voit & Mayer, Ltd.

(57) ABSTRACT

A device for position determination includes a light source and a planar measurement reflector movable along a measurement direction oriented perpendicular to the measurement reflector. A detector device is disposed such that a beam emitted by the light source strikes the detector device after impinging on the measurement reflector so that, in an event of a movement of the measurement reflector along the measurement direction, a signal results which is dependent on a position of the measurement reflector and from which a reference signal is generatable at a defined reference position. A deflection unit is disposed so as to deflect the beam such that the beam strikes the measurement reflector twice and therebetween passes through the deflection unit. The deflection unit is arranged so that a deviation in beam direction, resulting after the first reflection from a tilt of the measurement reflector, is compensated after the second reflection.

16 Claims, 7 Drawing Sheets

(51) Int. Cl.
*G01D 5/38* (2006.01)
*G01B 11/14* (2006.01)

(58) Field of Classification Search
CPC .. G01B 9/02017; G01B 9/02019; G01D 5/38; G01D 5/266; G01D 5/34715; G01D 5/347; G03F 7/70775
USPC .......................................................... 356/499
See application file for complete search history.

(56) References Cited

U.S. PATENT DOCUMENTS

| | | | |
|---|---|---|---|
| 6,429,940 B1 | 8/2002 | Willhelm | |
| 7,057,741 B1* | 6/2006 | Mueller | G01B 11/06 356/512 |
| 8,822,907 B2 | 9/2014 | Joerger et al. | |
| 2003/0169429 A1* | 9/2003 | Hill | G01B 9/02019 356/498 |
| 2004/0051881 A1* | 3/2004 | Holzapfel | G01D 5/34715 356/616 |
| 2005/0146727 A1* | 7/2005 | Hill | G01B 9/02019 356/498 |
| 2011/0235051 A1* | 9/2011 | Huber | G01B 11/14 356/499 |
| 2011/0286004 A1* | 11/2011 | Holzapfel | G01D 5/38 356/499 |
| 2012/0032067 A1* | 2/2012 | Goodwin | G01B 11/002 250/225 |
| 2012/0293809 A1* | 11/2012 | Garczarek | G01B 11/02 356/614 |
| 2013/0335746 A1 | 12/2013 | Huber et al. | |
| 2014/0104623 A1* | 4/2014 | Tsujii | G01J 3/0291 356/614 |

FOREIGN PATENT DOCUMENTS

| | | |
|---|---|---|
| DE | 102013203211 A1 | 12/2013 |
| EP | 0513427 B1 | 11/1992 |
| EP | 2450673 A2 | 5/2012 |
| EP | 2587212 A2 | 5/2013 |
| WO | WO 8905964 A1 | 6/1989 |

\* cited by examiner

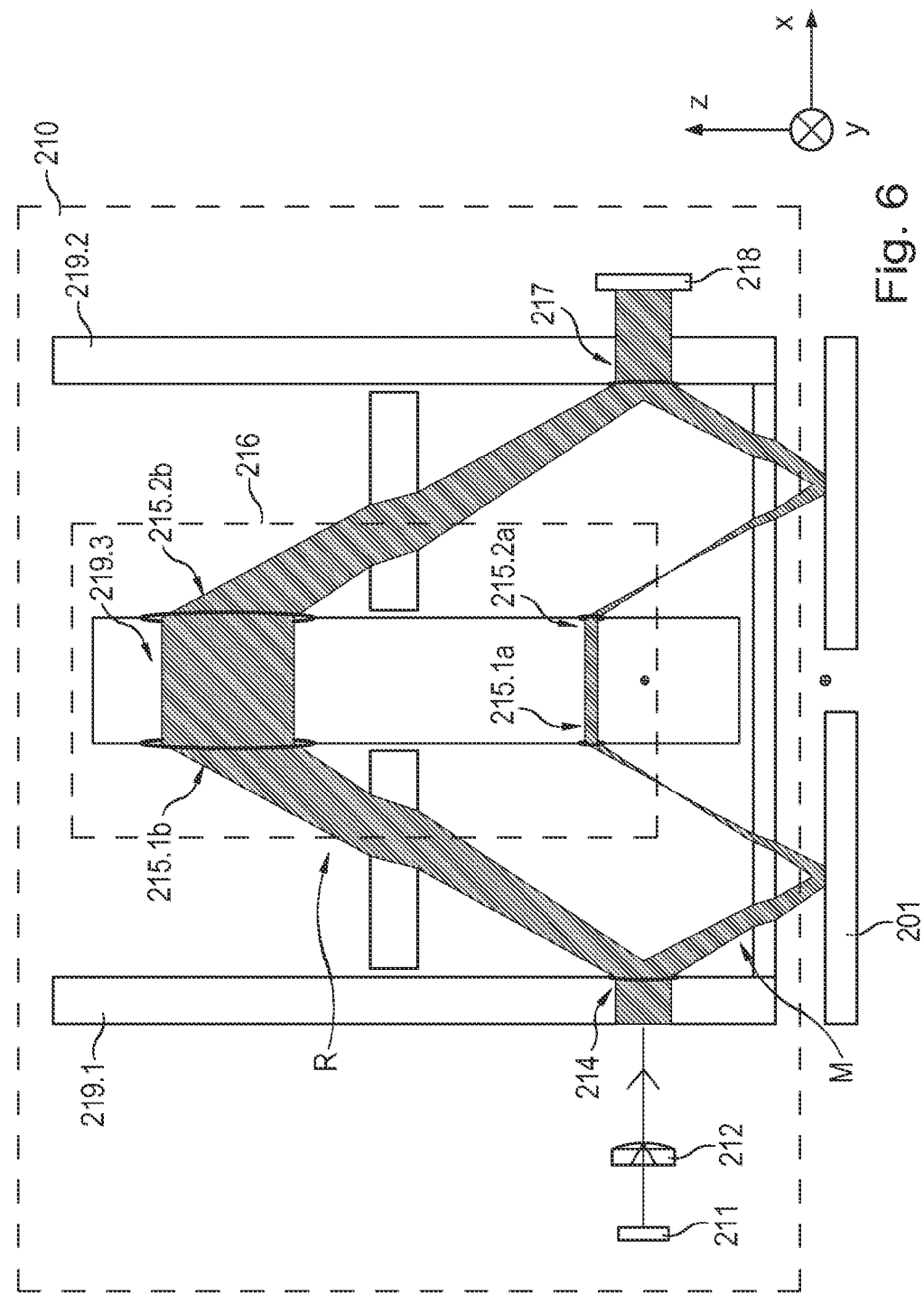

DEVICE FOR POSITION DETERMINATION

CROSS-REFERENCE TO RELATED APPLICATION

Priority is claimed to German Patent Application No. DE 10 2013 221 898.2, filed on Oct. 29, 2013, the entire disclosure of which is hereby incorporated by reference herein.

FIELD

The present invention relates to a device for position determination along a vertical measurement direction.

BACKGROUND

Besides measuring changes in position of two objects which are movable relative to each other in a lateral direction, there are measuring tasks where it is necessary, exclusively or possibly additionally, to also determine the distance between these objects in a vertical measurement direction perpendicular thereto. Devices for interferential distance measurement, such as are proposed, for example, in the Applicant's patent publication DE 10 2013 203 211 A1, lend themselves for a high-accuracy measurement along such a measurement direction. The devices described in this patent publication provide, at the output, high-resolution phase-shifted incremental signals via which such changes in position can be measured.

A similar device is also known from EP 2 587 212 A2. In the third embodiment and FIGS. 7-9 of this patent application, there is also proposed a way to establish an absolute reference for the incremental measurement. To this end, the beam emitted by a light source is initially directed via collimating optics, a beam splitter, a phase plate, and focusing optics onto a measurement reflector which is movable along the measurement direction. The beam is deflected by the measurement reflector toward a grating in the form of a reflection grating, which finally directs the beam to a detector device formed of two adjacent detector elements which are connected differentially. In the event of a movement of the measurement reflector along the measurement direction, the detector device acquires a signal that is dependent on the position of the measurement reflector and from which a reference signal can be generated at a defined reference position along the measurement direction. The high-resolution incremental signals can then be related to the so-determined reference position, thereby enabling an accurate absolute determination of the position of the measurement reflector along the vertical measurement direction.

However, the disadvantage of the device from EP 2 587 212 A2 recognized by the present invention is that in the event that the measurement reflector is tilted out of its normal position, errors may result in the position determination. This is because the signal phase, which changes during a change in distance along the vertical measurement direction, also changes linearly with the tilt angle.

SUMMARY

In an embodiment, the present invention provides a device for position determination including a light source and a planar measurement reflector movable along at least one measurement direction which is oriented perpendicular to the measurement reflector. A detector device is disposed such that at least one beam emitted by the light source strikes the detector device after impinging on the measurement reflector so that, in an event of a movement of the measurement reflector along the at least one measurement direction, at least one signal results which is dependent on a position of the measurement reflector and from which a reference signal is generatable at a defined reference position. A deflection unit is disposed so as to deflect the at least one beam such that the at least one beam strikes the measurement reflector twice, and, in between a first and a second reflection from the measurement reflector, passes through the deflection unit. The deflection unit is arranged so that a deviation in beam direction, resulting after the first reflection from a tilt of the measurement reflector, is compensated after the second reflection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 shows a third exemplary embodiment of the device according to the present invention in a schematic cross-sectional view.

DETAILED DESCRIPTION

Figure 1A:
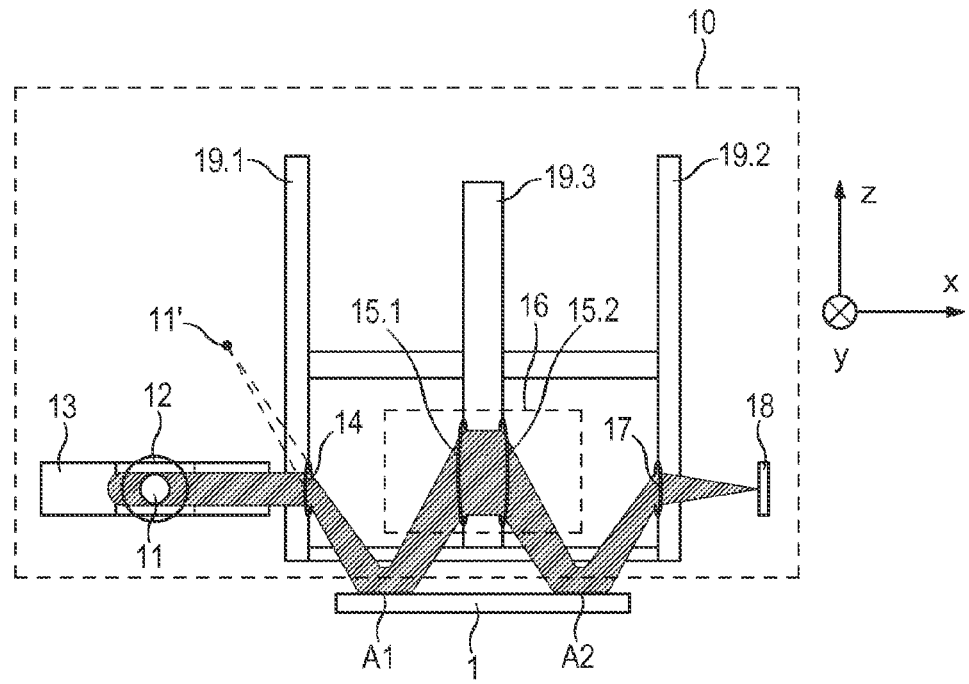
FIG. 1a shows a first exemplary embodiment of the device according to the present invention in a first schematic cross-sectional view.

In an embodiment, the present invention provides a device for high-accuracy position determination along a vertical measurement direction, which is as insensitive as possible to tilts of the measurement reflector about at least one tilt axis. In particular, the reference position to be determined along the measurement direction should, to the extent possible, only depend on the vertical distance, but not on a possible tilt of the measurement reflector.

The device according to an embodiment the present invention for position determination includes a light source, a planar measurement reflector which is movable along at least one measurement direction, the measurement direction being oriented perpendicular to the measurement reflector, and a detector device. At least one beam emitted from the light source strikes the detector device after impinging on the measurement reflector, so that in the event of a movement of the measurement reflector along the measurement direction, at least one signal results which is dependent on the position of the measurement reflector and from which a reference signal can be generated at a defined reference position. The beam strikes the measurement reflector twice, and, in between the first and second striking of the measurement reflector, passes through a deflection unit which is designed such that a deviation in beam direction resulting after the first reflection from tilt of the measurement reflector is compensated after the second reflection.

Advantageously, the deflection unit includes one or more optical components and is designed such that, in the event of tilt of the measurement reflector by an angle $\alpha$ about a tilt axis, a beam impinging a first time at an angle $\Theta$ to the normal to the non-tilted measurement reflector will impinge a second time on the measurement reflector at an angle $\Theta-2\alpha$ to the normal to the non-tilted measurement reflector after it has passed through the deflection unit.

It may be provided that the deflection unit includes one or more optical components which
either exert a converging optical effect on a divergent beam incident on the measurement reflector, or
exert a diverging optical effect on a convergent beam incident on the measurement reflector.

The at least one optical component may take the form of a refractive or diffractive optical element.

Moreover, the deflection unit may include a first and a second deflection grating as diffractive optical elements.

The deflection unit may include one or more optical components and be designed such that, in the plane of incidence, the beam that impinges a first time on the measurement reflector is imaged mirror-symmetrically to form the beam that propagates away from the measurement reflector after the second reflection.

Advantageously, a first transmission grating is arranged between the light source and the deflection unit, and a second transmission grating is arranged between the deflection unit and the detector device along the beam path.

It may be provided that the two transmission gratings, the deflection unit and the measurement reflector are arranged relative to each other in such a way that, in between passage of the beam through the first transmission grating and passage thereof through the second transmission grating, it strikes the measurement reflector at two points of incidence which are spaced apart from each other along a first direction that is oriented parallel to the direction of incidence of the beam on the first transmission grating.

Moreover, the light source, the transmission gratings, the deflection unit and the detector device may be disposed in a scanning unit which is disposed to be movable with respect to the measurement reflector along the measurement direction.

Furthermore, the transmission gratings may be arranged in the scanning unit on support elements oriented orthogonally to the measurement reflector,
the first transmission grating being arranged on a first support element,
the second transmission grating being arranged on a second support element,
the two deflection gratings being arranged on opposites sides of a transparent third support element which is plate-shaped and disposed between the first and second support elements.

It is also possible that
the beam emitted by the light source is deflected a first time toward the measurement reflector by the first transmission grating,
at the measurement reflector, there occurs a reflection of the beam toward the deflection unit,
the beam is deflected a second time toward the measurement reflector via the deflection unit,
at the measurement reflector, there occurs a reflection of the beam toward the second transmission grating, and
the beam is deflected toward the detector device via the second transmission grating.

It may be provided that
the first transmission grating is further designed such that the collimated beam incident thereon is transformed into a beam that is divergent in an xz-plane defined by the first direction and the measurement direction, and
the first deflection grating is further designed such that the beam incident thereon
is collimated in the xz-plane,
undergoes a deflection in an xy-plane defined by the first direction and a second direction perpendicular thereto, and
is focused in the xy-plane to a line focus located centrally in the deflection unit between the first and second deflection gratings and extending parallel to the measurement direction, and
the second deflection grating is further designed such that the beam incident thereon
undergoes a deflection in the xz-plane,
is transformed into a convergent beam in the xz-plane, and
is collimated in the xy-plane,
the second transmission grating is further designed such that the mean beam direction of the beam incident thereon is aligned parallel to a normal to the transmission gratings.

Moreover, it is possible that
the first transmission grating is further designed such that in an xz-plane defined by the first direction and the measurement direction, the collimated beam incident thereon forms an image of the light source at a first image point located between the first transmission grating and the measurement reflector, so that a beam which diverges in the xz-plane impinges on the first deflection grating,
the first deflection grating is further designed such that the beam incident thereon
is collimated in the xz-plane,
undergoes a deflection in an xy-plane defined by the first direction and a second direction perpendicular thereto, and
is focused in the xy-plane to a line focus located centrally in the deflection unit between the first and second deflection gratings and extending parallel to the measurement direction, and
the second deflection grating is further designed such that the beam incident thereon
undergoes a deflection in the xz-plane,
forms an image of the light source at a second image point located between the measurement reflector and the second transmission grating in the xz-plane, so that a beam which diverges in the xz-plane impinges on the second transmission grating, and
is collimated in the xy-plane, the second transmission grating is further designed to form an image of the second image point in a detection plane of the detector device.

The first transmission grating may be designed to split off a reference beam which, at the second transmission grating, is brought into interfering superposition with the beam that strikes the measurement reflector twice.

The transmission gratings and/or the deflection gratings may be designed as blazed gratings.

A decisive advantage of the approach according to an embodiment of the present invention is derived from the high insensitivity to tilts of the measurement reflector about at least one tilt axis, which makes it possible to reliably prevent errors in the position determination or in the generation of the reference signal. Furthermore, through additional measures, it may be ensured that the position determination is also insensitive to tilts about a further tilt axis.

Figure 1B:
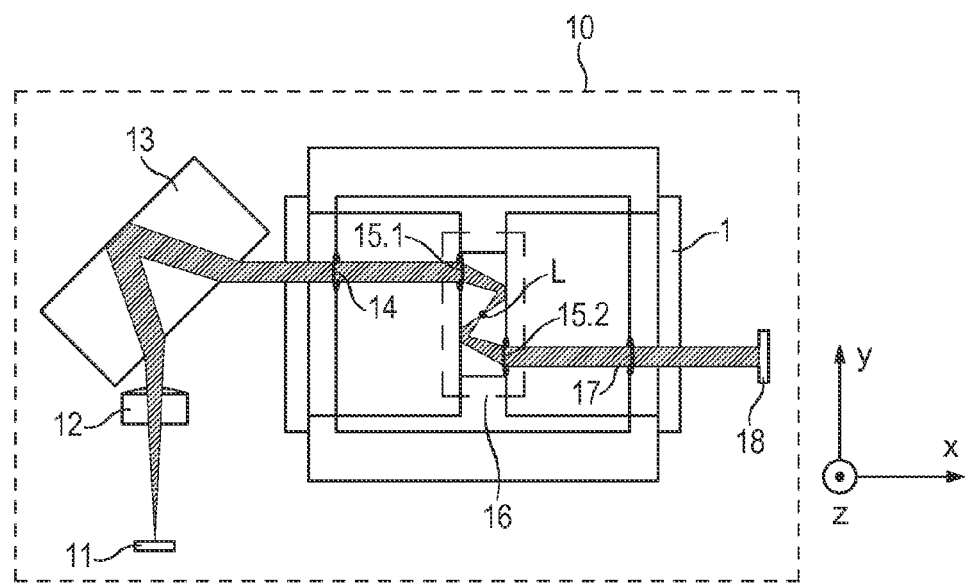
FIG. 1b shows the first exemplary embodiment of the device according to the present invention in a second schematic cross-sectional view.
Figure 1C:
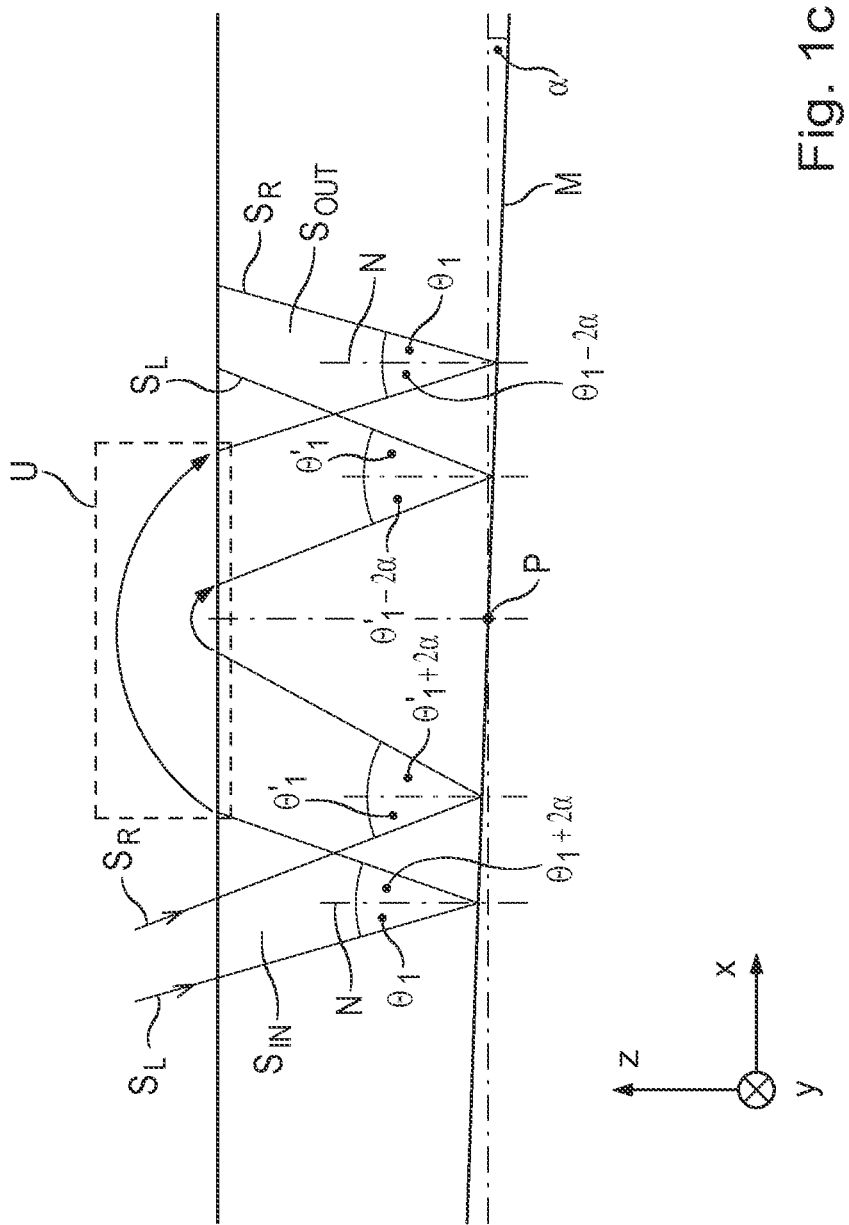
FIG. 1c shows a schematic view of a portion of the beam path to illustrate an important component of the device according to an embodiment of the present invention.
Figure 2A:
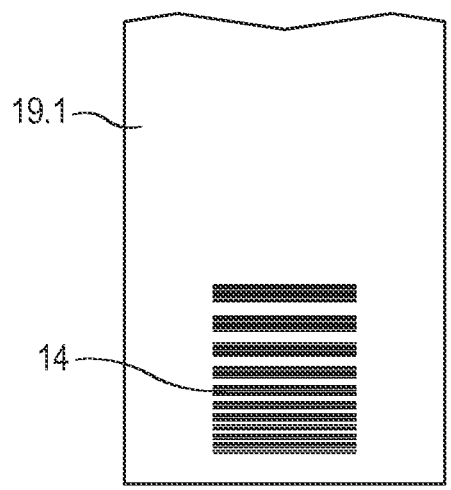
FIGS. 2a-2c are elevation views of the support elements of the first exemplary embodiment and the transmission gratings arranged thereon.
Figure 2A:
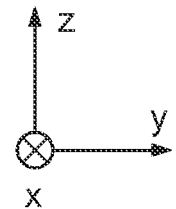
Figure 2B:
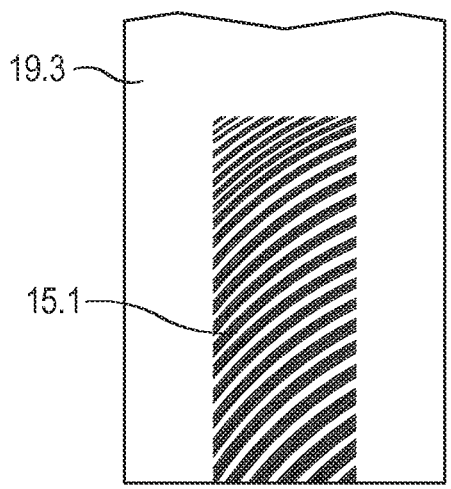
Figure 2B:
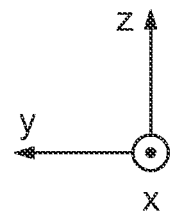
Figure 2C:
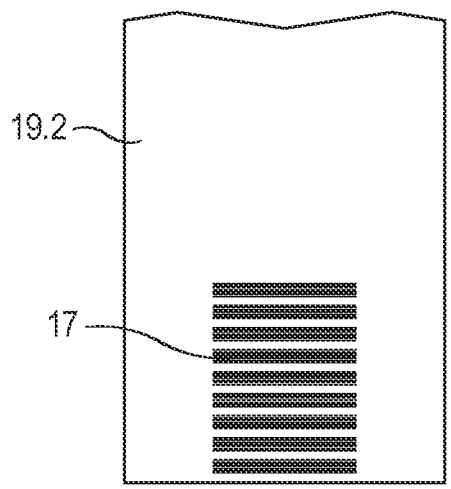
Figure 2C:
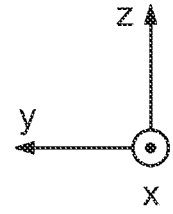
Figure 3:
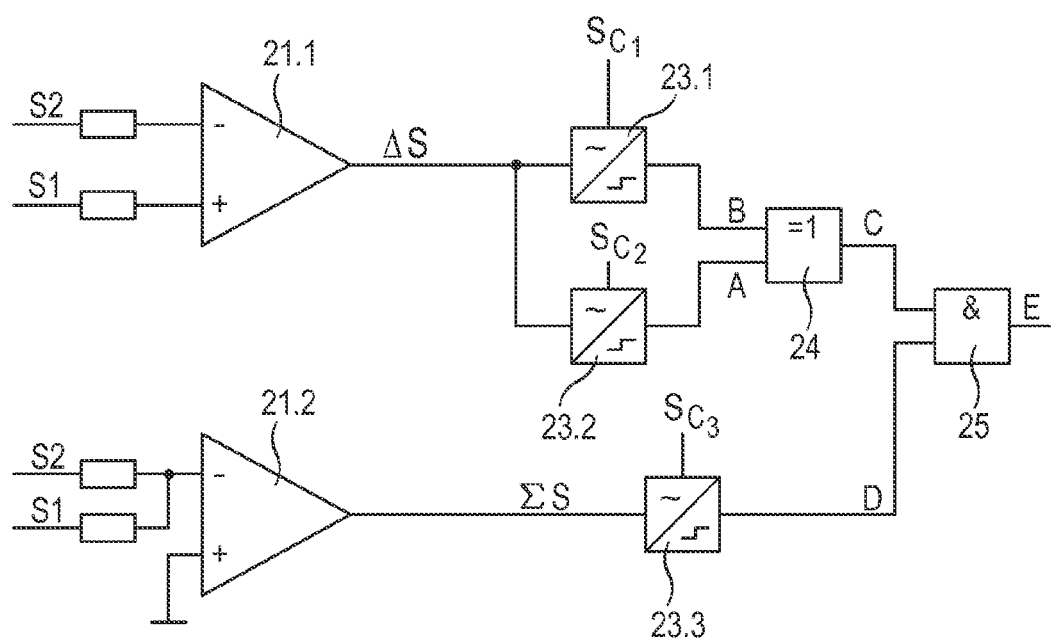
FIG. 3 shows the detector elements including the downstream circuit arrangement for generating a reference signal of the first exemplary embodiment.
Figure 3:
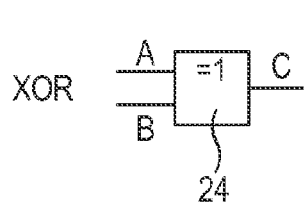
Figure 3:
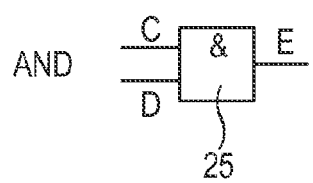

A first exemplary embodiment of the inventive device for position determination and various basic aspects thereof will be described in detail below with reference to FIGS. 1a-1c, 2a-2c, 3 and 4a-4c. FIGS. 1a and 1b show different schematic views of the beam path of this exemplary embodiment, while FIG. 1c shows a schematic view of a portion of the beam path to illustrate certain geometric relationships. FIGS. 2a-2c show elevation views of the support elements of this device and the transmission gratings arranged thereon. FIG. 3 depicts a circuit arrangement for generating a reference signal $S_R$ using the device of the preceding figures, and in FIGS. 4a-4c, various signal diagrams are shown to illustrate the generation of the reference signal.

The beam path for interferential generation of incremental distance signals, as proposed in the Applicant's patent publication DE 10 2013 203 211 A1 mentioned at the outset, is not shown in the figures for the sake of improved clarity. Accordingly, only the generation of a reference signal $S_R$ will be described hereinafter. The reference signal may then be arithmetically combined with the high-resolution incremental distance signals generated in accordance with DE 10 2013 203 211 A1.

The device according to an embodiment of the present invention includes a planar measurement reflector 1 and a number of further components 11-19.3 which, in the exemplary embodiment shown, are disposed in a schematically indicated scanning unit 10. Planar measurement reflector 1 extends in a plane along a first direction x and a second direction y perpendicular thereto. This plane will hereinafter also be referred to as the mounting plane of the measurement reflector, or as xy-plane. In FIG. 1, the xy-plane is oriented perpendicular to the plane of the drawing; i.e., to the xz-plane, while in FIG. 1b, the mounting plane of measurement reflector 1 is oriented parallel to the plane of the drawing; i.e., parallel to the xy-plane.

In the exemplary embodiment shown, the components 11-19.3 provided in scanning unit 10 include a light source 11, collimating optics 12, a glass plate 13, a detector device 18, as well as three support elements 19.1-19.3 on which are arranged two transmission gratings 14, 17, as well as two deflection gratings 15.1, 15.2 of a deflection unit 16, the gratings having defined optical effects, which will be explained in detail hereinafter.

Planar measurement reflector 1 is disposed to be movable with respect to scanning unit 10, or with respect to at least some of the other components 11-19.3, along a vertical measurement direction. The vertical measurement direction is oriented perpendicular to planar measurement reflector 1 and its xy-mounting plane, and is designated by coordinate z in the figures, and will also be referred to as measurement direction z hereinafter. For example, measurement reflector 1, on the one hand, and scanning unit 10 on the other hand, may be connected to machine components which are movable with respect to each other, inter alia, along measurement direction z. In the event of relative movement of measurement reflector 1 with respect to scanning unit 10, the device generates at least one signal which is dependent on the position of measurement reflector 1 along measurement direction z. From the signal so generated, a reference signal $S_R$ can then be generated or derived at a defined reference position $z_{REF}$ along measurement direction z, the reference signal being further processed by a downstream machine controller, for example, by arithmetically combining it with the generated incremental distance signals.

Alternatively to arranging all components 11-19.3 in a common scanning unit 10, it is also within the scope of an embodiment of the present invention, for example, to dispose light source 1 and/or detector device 18 spatially apart from scanning unit 10 and to connect them to scanning unit 10 via optical waveguides. This is advantageous, for example, when no heat input from the light source is desired at the measurement location, or when the detector device should, to the extent possible, not be disturbed by influences at the measurement location.

The beam path provided for generating a reference signal $S_R$ in the present exemplary embodiment of the inventive device will now be explained in detail.

A light source 11 embodied, for example, as a point-like or nearly point-like semiconductor laser or as an LED, emits a beam which is collimated by collimating optics 12. The collimated beam is deflected toward a first transmission grating 14 by reflection at the rear surface of a glass plate 13 placed at 45° in the beam path. First transmission grating 14 is arranged on a first support element 19.1 which takes the form of a transparent glass plate and is arranged orthogonally to measurement reflector 1; i.e., orthogonally to the xy-plane. Thus, in FIG. 1a, first support element 19.1 extends in the yz-plane perpendicularly to the plane of the drawing.

First transmission grating 14 exerts different optical effects on the collimated beam incident thereon and is suitably designed for this purpose. For example, firstly, it causes a deflection of the beam in such a manner that the beam is deflected a first time toward measurement reflector 1. As can be seen from FIG. 1a, this deflection takes place in the xz-plane. Secondly, first transmission grating 14 has a cylindrical lens function having a negative focal length, so that the incident collimated beam is transformed into a beam that diverges only in the xz-plane, but continues to propagate in collimated fashion in the xy-plane according to FIG. 1b.

These different optical functions can be combined in a single transmission grating by adding together the phase functions of the individual optical functionalities, so that an overall grating phase function of first transmission grating 14 results from superposition of individual phase functions. When implemented as a binary grating structure, the superposed overall grating phase function is binarized, thereby defining the position and shape of the grating lines of first transmission grating 14. Preferably, first transmission grating 14 is designed as a blazed grating in which undesired diffraction orders are minimized, such diffraction orders being, for example, those which originate from first transmission grating 14 and propagate in the xz-plane in the positive z-direction.

The partially divergent beam influenced by the transmission grating in the described manner then arrives at measurement reflector 1 a first time at a first point of incidence A1, from where it is reflected toward scanning unit 10; i.e., toward the first deflection grating 15.1 of a deflection unit 16. First deflection grating 15.1 is also designed as a transmission grating and is arranged on a first side of a third support element 19.3 in scanning unit 10. Like first support element 19.1, third support element 19.3 takes the form of a transparent glass plate extending in the yz-plane perpendicularly to measurement reflector 1.

First deflection grating 15.1, designed as a transmission grating, exerts different, defined optical effects on the beam incident thereon and also has a certain cylindrical lens effect. For example, it deflects the incident beam toward the second deflection grating 15.2 of deflection unit 16, which is arranged on the second, opposite side of third support element 19.3 and is also in the form of a transmission grating. Here, the beam is collimated in the xz-plane, as can be seen from FIG. 1a. Moreover, due its design, the first deflection grating 15.1 according to FIG. 1b causes a deflection in the xy-plane and, after a reflection at the second, opposite side of third support element 19.3, a focusing in the xy-plane to a line focus L. Line focus L is located centrally in third support element 19.3 and extends parallel to measurement direction z.

Beyond line focus L, the beam then propagates further toward second deflection grating 15.2 point-symmetrically with respect to line focus L in the xy-plane, as can be seen from FIG. 1b. This means that, after reflection at the first side of third support element 19.3, the beam, which is divergent in the xy-plane again, strikes second deflection grating 15.2. Second deflection grating 15.2 is disposed opposite first deflection grating 15.1 on the second side of third support element 19.3 and is mirror-symmetric with respect to the xz-plane in terms of its optical function. However, as shown in the respective elevation view in FIG. 2b, it is configured identically to first deflection grating 15.1 of deflecting unit 16. Thus, by means of its cylindrical lens function, second deflection grating 15.2 firstly causes a deflection of the beam incident thereon in such a manner that the beam is deflected a second time toward measurement reflector 1, so that firstly a deflection is produced in the xz-plane, as illustrated in FIG. 1a. Secondly, as can be seen from FIG. 1a, second deflection grating 15.2 transforms the beam into a convergent beam in the xz-plane and collimates it in the xy-plane, as illustrated in FIG. 1b.

After the beam so affected strikes measurement reflector 1 a second time at second point of incidence A2, which is spaced apart from first point of incidence A1 in the x-direction, it finally impinges on second transmission grating 17, which is arranged on second support element 19.2. Second support element 19.2, in turn, is configured like the other two support elements 19.1, 19.3. Second transmission grating 17 causes a deflection of the beam incident thereon toward the downstream detector device 18, and aligns the mean beam direction of the beam incident thereon to be parallel to a normal to the transmission gratings 14, 17 and deflection gratings 15.1, 15.2 traversed.

Moreover, analogous to first transmission grating 14, the two deflection gratings 15.1, 15.2 and second transmission grating 17 may be designed as blazed gratings.

The fundamental operating principle of the device according to an embodiment of the present invention, which is based on the illustrated beam path, may be described as follows: In an alternative representation of the beam path, a virtual light source 11' is assumed to be located in the beam path upstream of first transmission grating 14, as illustrated in FIG. 1a. According to FIG. 1a, a divergent beam propagates from virtual light source 11' in the xz-plane. In this xz-plane, due to the cylindrical lens effects that the two deflection gratings 15.1, 15.2 have on the beam, virtual light source 11' is imaged onto detector device 18; i.e., into the detection plane thereof. In the process, prior to striking first deflection grating 15.1, the beam impinges on measurement reflector 1 a first time at a point of incidence A1, and after passage through second deflection grating 15.2, it impinges on measurement reflector 1 a second time at a point of incidence A2. Any beam propagating toward the combination of the two deflection gratings 15.1, 15.2 on the common support element 19.3 and subsequently away therefrom is guided via measurement reflector 1. Therefore, measurement reflector 1 defines an image of deflection gratings 15.1 and 15.2, at which they appear to be positioned. In the event that measurement reflector 1 is displaced by an amount $\Delta z$ along measurement direction z, this image is displaced by an amount $2 \cdot \Delta z$. This means that the cylindrical lens effects provided in deflection gratings 15.1, 15.2 are displaced by an amount $2 \cdot \Delta z$ and, accordingly, that they image virtual light source 11' onto detector device 18 such that it is displaced by an amount $4 \cdot \Delta z$ along measurement direction z.

The generation of the reference signal from the signals so acquired by detector device 18 will now be explained with reference to FIGS. 3 and 4a-4d.

Figure 4A:
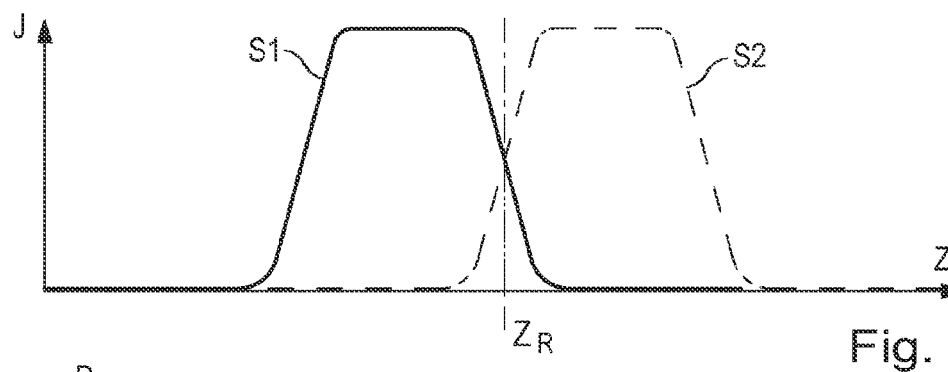
FIGS. 4a-4e show various signal diagrams to illustrate the generation of the reference signal in the first exemplary embodiment using the circuit arrangement of FIG. 3.
Figure 4B:
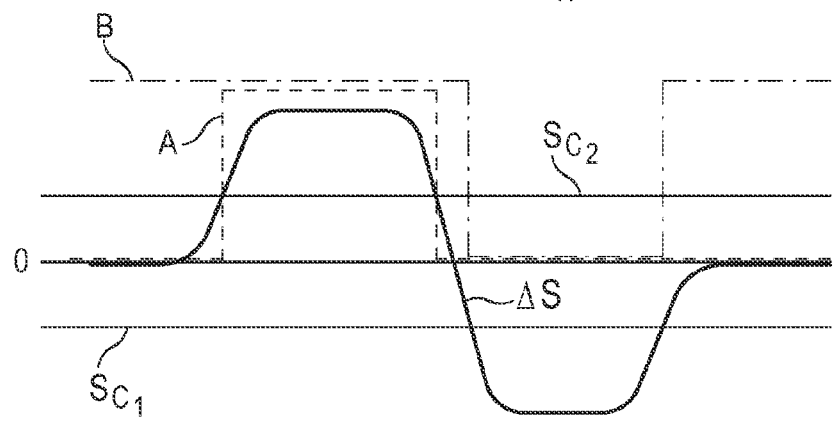
Figure 4C:
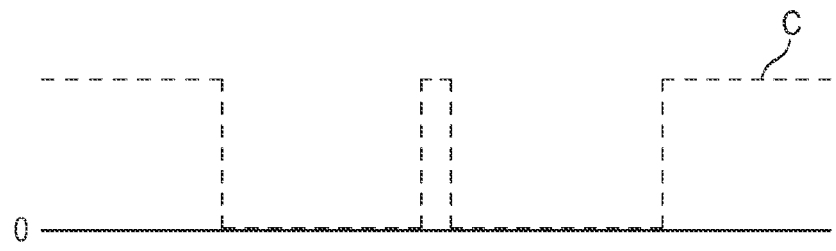
Figure 4D:
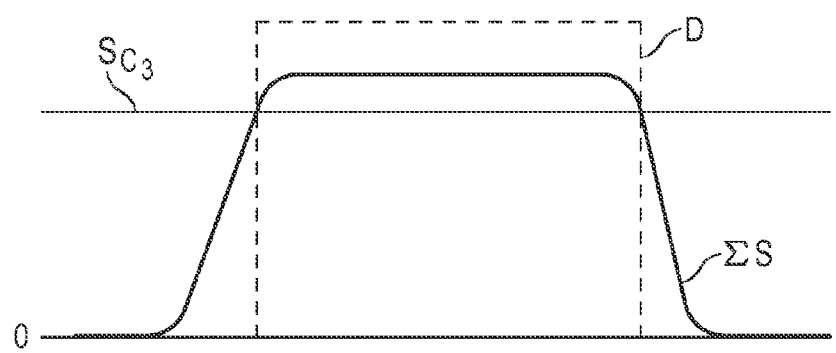

In the present exemplary embodiment, the detector device includes two detector elements which are arranged adjacent each other in measurement direction z and which provide the signals S1, S2, whose shapes in the region of the reference position are shown in FIG. 4a. A difference element 21.1 generates a difference signal $\Delta S$ from the two signals S1, S2, and an addition element 21.2 generates a sum signal $\Sigma S$ therefrom. The shapes of differential signal $\Delta S$ and sum signal $\Sigma S$ are shown in FIGS. 4b and 4d. As can be seen from FIG. 4d, in the event of a z-displacement of the measurement reflector, sum signal $\Sigma S$ is nearly constant only over a portion of the measurement range. In this partial range, sum signal $\Sigma S$ is large and serves as a reference level.

Difference signal $\Delta S$ fed in parallel to two comparator stages 23.1, 23.2, which compare it to slightly different thresholds $S_{C1}$ and $S_{C2}$, respectively, which are each obtained from sum signal $\Sigma S$ by voltage dividers. Due to the different thresholds $S_{C1}$ and $S_{C2}$, the corresponding switching positions x1 and x2 of the two comparator stages 23.1, 23.2 are slightly displaced relative to each other. A XOR combination of the square wave signals A, B resulting at the outputs of the comparator stages via XOR element 24 yields the signal C shown in FIG. 4c. The logic table associated with XOR element 24 is shown in the lower portion of FIG. 3.

In accordance with FIG. 3, sum signal $\Sigma S$ is fed to a further comparator stage 23.3, where it is compared to threshold $S_{C3}$. Finally, the square wave signal D shown in FIG. 4d results at the output of comparator stage 23.3.

Figure 4E:
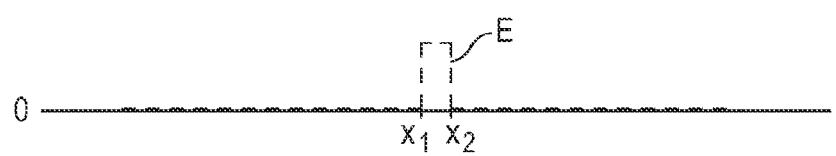

The signals C and D so generated are then fed to an AND element 25 and logically combined accordingly, whereupon the reference signal E shown in FIG. 4e results at the output of AND element 25. The logic table associated with AND element 25 is also shown in the lower portion of FIG. 3.

The position and width of the outputted reference signal E can be selected within wide limits by electronically adjusting the two thresholds $S_{C1}$ and $S_{C2}$. Advantageous is a width x2-x1 which corresponds to the signal period of the incremental scanning signals. This means that, within a displacement range of measurement reflector 1 in measurement direction z, reference signal E indicates a reference position which has the width of one signal period of the incremental scanning signals. This makes it possible to uniquely reference a signal period of the incremental scanning signals, the value of the incremental counter, for example, being set to zero there.

Using the device according to an embodiment of the present invention, the effect that tilts of measurement reflector 1 may have on the measurement accuracy can now be minimized in a particularly advantageous manner. Such tilts may result, for example, from failure to meet assembly tolerances during installation in the respective application.

In the device according to an embodiment of the present invention, the insensitivity to tilts of measurement reflector 1 about first direction y is ensured, firstly, in that the beam strikes measurement reflector 1 twice due to the trajectory selected for the beam path. Secondly, deflection unit 16 is suitably designed to ensure that a deviation in beam direction resulting after the first reflection from tilt of the measurement reflector is compensated after the second reflection. In this way, a possible displacement of the beam incident on the detector device is minimized when measurement reflector 1 is tilted about a tilt axis extending in the y-direction. In this connection, reference is made to FIG. 1c, which is intended to illustrate these relationships.

In FIG. 1c, measurement reflector M of the device according to an embodiment of the present invention is shown in a position tilted at an angle α with respect to the y-axis. The normal non-tilted position of measurement reflector M is indicated by a broken line. Shown is a divergent or partially divergent beam $S_{IN}$ incident on measurement reflector M; i.e., its laterally bounding marginal rays $S_L$, $S_R$, as well as the first reflection at measurement reflector M. The passage of the beam through deflection unit U, the second reflection of the beam at measurement reflector M, and the convergent or partially convergent beam $S_{OUT}$ finally propagating away from the measurement reflector are indicated only schematically.

As can be seen from FIG. 1c, the left marginal ray $S_L$ of the divergent incident beam $S_{IN}$ strikes the tilted measurement reflector at an angle $\Theta_1$ and the right marginal ray $S_R$ at an angle $\Theta_1'$ to a normal N. Normal N is perpendicular to the non-tilted measurement reflector M. After the first reflection of incident beam $S_{IN}$ at measurement reflector M, the reflected marginal rays $S_L$, $S_R$ propagate toward deflection unit U at the angles $\Theta_1+2\alpha$ and $\Theta_1'+2\alpha$, respectively. Thus, as opposed to the non-tilted measurement reflector M, incident beam $S_{IN}$ experiences a deviation in beam direction $2\alpha$ after the first reflection due to the tilt of the measurement reflector. As indicated in FIG. 1c, deflection unit U is designed such that this deviation in beam direction is compensated after the second reflection of the beam at measurement reflector M. Through a suitable optical design of deflection unit U, it is ensured that, upon passage through deflection unit U, left marginal ray $S_L$ of the beam strikes the tilted measurement reflector M at an angle $\Theta_1-2\alpha$ with respect to normal N and right marginal ray $S_R$ at an angle $\Theta_1'-2\alpha$. Accordingly, in the plane of incidence, the beam $S_{IN}$ impinging on measurement reflector M a first time is imaged mirror-symmetrically by deflection unit U to form the beam that propagates away from measurement reflector M after the second reflection; i.e., the outgoing beam $S_{OUT}$.

This function of deflection unit U results from the image formation in the y-direction by one or more cylindrical lenses, which converts the incoming divergent (convergent) beam into an outgoing convergent (divergent) beam which exits mirror-symmetrically or nearly mirror-symmetrically with respect to a yz-plane through point of rotation P. According to FIG. 1a, this image formation is performed via the two cylindrical lens functions in the y-direction of deflection gratings 15.1 and 15.2, which preferably have the same focal length and are arranged symmetrically with respect to point of rotation P of measurement reflector 1 in the x-direction. Virtual light source 11' must be located in the focal plane of the first cylindrical lens. Point of rotation P of measurement reflector 1 is defined here as the effective measuring point of the device according to an embodiment of the present invention, in which tilt of measurement reflector 1 will not produce any displacement of the reference signals in a linear approximation. This effective measuring point should coincide with the effective measuring point of the incremental scanning to maintain the exact association of the reference signals to the incremental signals even in the case of small tilts of measurement reflector 1. The effective measuring point; i.e., point of rotation P, is preferably selected to be located in the middle between the two points of incidence A1 and A2 of the beam on measurement reflector 1. With such a design of deflection unit U, marginal rays $S_R$ and $S_L$ exit at the angles $\Theta_1-2\alpha$ and $\Theta_1'-2\alpha$, respectively, with respect to normal N, as described above.

Thus, after the second reflection of the beam at measurement reflector M, beam $S_{OUT}$; i.e., its bounding marginal rays $S_L$, $S_R$ leave the tilted measurement reflector M at the angles $\Theta_1$ and $\Theta_1'$, respectively, toward the second transmission grating, and thus, marginal rays $S_L$, $S_R$ of beam $S_{OUT}$ have the same directions as marginal rays $S_L$, $S_R$ of incident beam $S_{IN}$. Accordingly, by means of the two impingements on measurement reflector M and the suitable design of deflection unit U, it is possible to prevent, or at least minimize, measurement errors resulting from tilt of measurement reflector M about an axis parallel to the y-direction, which would otherwise occur because of the phase shifts caused by such tilt.

The deflection unit U required for this, which is indicated only schematically in FIG. 1c, may, in principle, be implemented in many different ways and includes for this purpose one or more suitably designed optical components which, in turn, may be designed a refractive or diffractive optical elements. In the example of FIG. 1c, the optical components of deflection unit U exert a converging effect on the divergent beam $S_{IN}$ incident on measurement reflector M. As can be seen from FIG. 1c, the beam $S_{OUT}$ leaving measurement reflector M after the second reflection is convergent. Conversely, given a suitable design of the deflection unit, an incident convergent beam could propagate further in a divergent manner after the second reflection at the measurement reflector. Similar considerations apply, of course, to only partially divergent and partially convergent incident beams and their transformation into partially convergent and partially divergent outgoing beams, respectively.

In the illustrated first exemplary embodiment of FIGS. 1a, 1b, deflection unit 16 includes, as corresponding diffractive optical elements, the two deflection gratings 15.1, 15.2, which are each designed as transmission gratings having the optical functionalities described above.

Alternatively, the deflection unit may also include other optical elements which exert a corresponding compensating effect on the beam passing therethrough. For example, in the case of a divergent incident beam, a converging lens may be used as a suitable refractive optical element in the deflection unit, while in the case of a convergent incident beam, a diverging lens may be used. It would also be possible to use corresponding, suitably designed transmission gratings, as well as combinations of such optical elements.

In addition to the described reduction of the sensitivity to tilts about a tilt axis parallel to the y-direction, it is also possible, through suitable design of deflection unit, to ensure insensitivity to tilt of the measurement reflector about second direction x. To this end, in the first exemplary embodiment, first deflection grating 15.1 is adapted to focus the beam incident thereon in the xy-plane, and second deflection grating 15.2 is adapted to effect a recollimation in this plane, as can be seen, for example, in FIG. 1b. Thus, through suitable design of first and second deflection gratings 15.1, 15.2 in deflection unit 16, it is further ensured that in the event of a possible tilt of measurement reflector 1 about a tilt axis extending in the x-direction, the beam incident on detector device 18 will hardly be displaced along the y-direction. Thus, the reference signal $S_R$ produced also remains unaffected in linear order in the case of such tilt of measurement reflector 1. Accordingly, through suitable design of deflection unit 16, the sensitivity to tilts may also be minimized with respect to other tilt axes.

With regard to potential tilts of the measurement reflector about the x- or y-direction, it is also advantageous if the scanning procedure provided according to an embodiment of the present invention to produce the reference signal has the same effective measuring point in the xy-plane as the scanning procedure for producing the incremental signals. In this connection, the effective measuring point of both scanning procedures lies in the xy-plane preferably in the middle between the two points of incidence A1 and A2 of the beam for reference signal generation. In this way, it is possible to avoid a possible offset of reference signal $S_R$ with respect to the produced incremental signals in the event of tilt of the measurement reflector, which could otherwise result in errors during position determination.

Figure 5A:
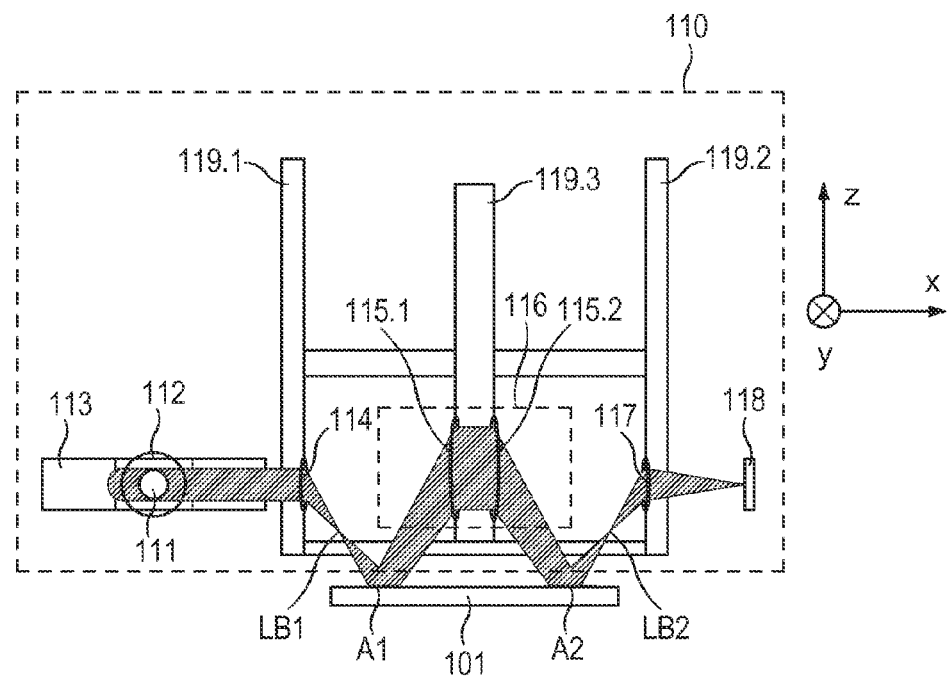
FIG. 5a shows a second exemplary embodiment of the device according to the present invention in a first schematic cross-sectional view.
Figure 5B:
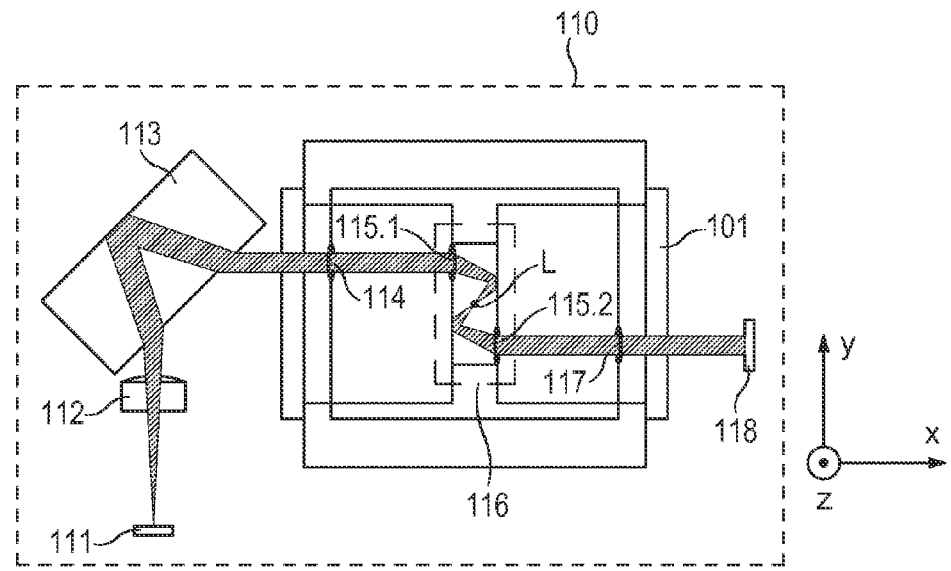
FIG. 5b shows the second exemplary embodiment of the device according to the present invention in a second schematic cross-sectional view.

In the following, a second exemplary embodiment of the device according to the present invention will be described with reference to FIGS. 5a and 5b. Analogous to the first exemplary embodiment, these two figures show different schematic views of the beam path for reference signal generation. In the following, only the relevant differences from the first exemplary embodiment will be described.

Here, in particular, the two transmission gratings 114, 117 traversed and deflection gratings 115.1, 115.2 of deflection unit 116 are designed differently than in the first exemplary embodiment. While in the first exemplary embodiment, the first transmission grating used had a cylindrical lens function having a negative focal length, now first transmission grating 114 is provided with a cylindrical lens function having a positive focal length. Because of this, first transmission grating 114 forms an image of light source 111 at a first image point LB1 located between first transmission grating 114 and third support element 119.3. A divergent beam propagates from first image point LB1 via first point of incidence A1 on measurement reflector 101 toward third support element 119.3, on whose side facing first transmission grating 114 is arranged first deflection grating 115.1, which, in turn, has a cylindrical lens function in the xz-plane, via which the beam is collimated in the xz-plane, while in the xy-plane, the beam is focused to line focus L. Accordingly, the focal length of first deflection grating 115.1 with respect to the cylindrical lens function must be shorter than in the first embodiment. Second deflection grating 115.2 images light source 111 symmetrically to line focus L at a second image point LB2 located between second deflection grating 115.2 and second transmission grating 117. Second transmission grating 117 finally images second image point LB2 onto detector device 118. Since image points LB1 and LB2 are located in immediate proximity to third support element 119.3, it is possible to achieve a significantly greater divergence angle and thus a significantly larger aperture. Since the larger aperture also increases the edge steepness of signals S1 and S2 accordingly, this embodiment makes it possible to achieve reference signals of even smaller width. This is especially advantageous when high resolution is required in connection with a small signal period of the incremental signals and the width of the reference signal $S_R$ produced according to an embodiment of the present invention is to be equal to this small signal period.

Finally, a third embodiment of the device according to the present invention will be described with reference to FIG. 6, which shows a schematic view of the beam path for reference signal generation. Again, only the relevant differences from the preceding exemplary embodiments will be described hereinafter.

The third exemplary embodiment of the device according to the present invention provides for reference signal $S_R$ to be generated interferentially. To this end, so-called chirped gratings are used as transmission gratings, namely the gratings denoted by reference numerals 214, 215.1a, 215.1b, 215.2a, 215.2b and 217. For details of such reference signal generation, reference is expressly made to the Applicant's patent publications EP 513 427 B1 and DE 197 48 802 B4. By using the chirped gratings, particularly high spatial resolution is possible here with respect to reference signal $S_R$; i.e., a very small width of reference signal $S_R$.

In contrast to the first two exemplary embodiments, which are based on the optical imaging properties of the respective transmission gratings traversed, in the third exemplary embodiment, the beam incident from light source 211 and collimating optics 212 is split at first transmission grating 210 into a measurement beam M and a reference beam R, which are used for interferentially generating a reference signal.

As in the preceding exemplary embodiments, in addition to the optical splitting function, first transmission grating 214 also performs a cylindrical lens function on the separated measurement and reference beams M, R. In the illustrated exemplary embodiment of FIG. 6, first transmission grating 214 has both a positive and a negative focal length, namely a positive focal length for measurement beam M and a negative focal length for reference beam R. In principle, the association may also be vice versa.

For both measurement beam M and reference beam R, respective first deflection gratings 215.1a, 215.1b and respective second deflection gratings 215.2a, 215.2b are provided on the central, third support element 219.3 in deflection unit 216, which recollimate the respective beams M, R in the xz-plane. It is, in principle, also possible here to focus the measurement and reference beams M, R in the yz-plane as in the first two exemplary embodiments to thereby compensate for a tilt about a tilt axis which is oriented parallel to the x-direction.

After passage through third support element 219.3, measurement and reference beams M, R propagate mirror-symmetrically in the xz-plane until they are superimposed at second transmission grating 217. Second transmission grating 217 functions here as a recombining grating, recollimates the two beams M, R and causes the +1st and −1st diffraction orders to interfere.

Alternatively to using the +/−$1^{st}$ diffraction orders, it is also possible to generate two signals from the $0^{th}$ and $2^{nd}$ orders, which may be further processed to produce a reference signal.

The measurement principle used in this exemplary embodiment corresponds to that used for generating incremental signals, such as is described in detail in the patent publication DE 10 2013 203 211 A1 mentioned at the outset. The chirped patterns of transmission gratings 214, 215.1a, 215.1b, 215.2a, 215.2b function in the manner of a superposition of incremental scans having continuously distributed signal periods having a common zero or reference position. Outside this common zero position, the modulation of the signal is strongly attenuated, so that such a signal can be used as a reference signal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for position determination comprising:
   a light source;
   a planar measurement reflector movable along at least one measurement direction which is oriented perpendicular to the measurement reflector;
   a detector device disposed such that at least one beam emitted by the light source strikes the detector device after impinging on the measurement reflector so that, in an event of a movement of the measurement reflector along the at least one measurement direction, at least one signal results which is dependent on a position of the measurement reflector and from which a reference signal is generatable at a defined reference position; and
   a deflection unit disposed so as to deflect the at least one beam such that the at least one beam strikes the measurement reflector twice, and, in between a first and a second reflection from the measurement reflector, passes through the deflection unit, the deflection unit being arranged so that a deviation in beam direction, resulting after the first reflection from a tilt of the measurement reflector by an angle α about a tilt axis, is compensated after the second reflection using one or more optical components that are designed such that a beam impinging a first time at an angle Θ to a normal to the measurement reflector in a non-tilted state will impinge a second time on the measurement reflector at an angle Θ−2α to the normal to the measurement reflector in the non-tilted state after it has passed through the deflection unit, wherein a first transmission grating is arranged between the light source and the deflection unit, and a second transmission grating is arranged between the deflection unit and the detector device along a path of the at least one beam.

2. The device as recited in claim 1, wherein the one or more optical components are configured to one of:
   exert a converging optical effect on a divergent beam incident on the measurement reflector; and
   exert a diverging optical effect on a convergent beam incident on the measurement reflector.

3. The device as recited in claim 1, wherein the one or more optical components include at least one refractive or at least one diffractive optical element.

4. The device as recited in claim 3, wherein the deflection unit includes a first and a second deflection grating as the at least one diffractive optical element.

5. The device as recited in claim 4, wherein the deflection gratings are blazed gratings.

6. The device as recited in claim 1, wherein the deflection unit is designed such that, in a plane of incidence, a first portion of the at least one beam that impinges a first time on the measurement reflector is imaged mirror-symmetrically to form a second portion of the at least one beam that propagates away from the measurement reflector after the second reflection.

7. The device as recited in claim 1, wherein the transmission gratings, the deflection unit and the measurement reflector are arranged relative to each other in such a way that, in between a passage of the at least one beam through the first transmission grating and a passage of the at least one beam through the second transmission grating, the at least one beam strikes the measurement reflector at two points of incidence which are spaced apart from each other along a first direction that is oriented parallel to a direction of incidence of the at least one beam on the first transmission grating.

8. The device as recited in claim 1, wherein the light source, the transmission gratings, the deflection unit and the detector device are disposed in a scanning unit which is disposed to be movable with respect to the measurement reflector along the at least one measurement direction.

9. The device as recited in claim 1, wherein the deflection unit includes a first and a second deflection grating, the first transmission grating being arranged on a first support element, the second transmission grating being arranged on a second support element and the first and the second deflection gratings being arranged on opposites sides of a transparent third support element which is plate-shaped and disposed between the first and the second support elements, and wherein the first and the second transmission gratings are arranged in a scanning unit and the first and the second support elements are oriented orthogonally to the measurement reflector.

10. The device as recited in claim 1, wherein the first transmission grating is configured to deflect the at least one beam a first time toward the measurement reflector from where the at least one beam is reflected toward the deflection unit, the deflection unit is configured to deflect the at least one beam a second time toward the measurement reflector from where the at least one beam is reflected toward the second transmission grating and the second transmission grating is configured to deflect the at least one beam toward the detector device.

11. The device as recited in claim 10, wherein the transmission gratings, the deflection unit and the measurement reflector are arranged relative to each other in such a way that, in between a passage of the at least one beam through the first transmission grating and a passage of the at least one beam through the second transmission grating, the at least one beam strikes the measurement reflector at two points of incidence which are spaced apart from each other along a first direction that is oriented parallel to a direction of incidence of the at least one beam on the first transmission grating, and wherein:
  the first transmission grating is configured to transform a collimated beam incident thereon into a beam that is divergent in an xz-plane defined by the first direction and the at least one measurement direction;
  the first deflection grating is configured to collimate the beam incident thereon in the xz-plane, cause the beam to undergo a deflection in an xy-plane defined by the first direction and a second direction perpendicular thereto and focus the beam in an xy-plane to a line focus located centrally in the deflection unit between the first and the second deflection gratings and extending parallel to the at least one measurement direction;
  the second deflection grating is configured to cause the beam incident thereon to undergo a deflection in the xz-plane, transform the beam into a convergent beam in the xz-plane and collimate the beam in the xy-plane; and
  the second transmission grating is configured to align the beam incident thereon such that a mean beam direction of the beam is aligned parallel to a normal to the transmission gratings.

12. The device as recited in claim 10, wherein the transmission gratings, the deflection unit and the measurement reflector are arranged relative to each other in such a way that, in between a passage of the at least one beam through the first transmission grating and a passage of the at least one beam through the second transmission grating, the at least one beam strikes the measurement reflector at two points of incidence which are spaced apart from each other along a first direction that is oriented parallel to a direction of incidence of the at least one beam on the first transmission grating, and wherein:
  the first transmission grating is configured to form, by a collimated beam incident thereon, a first image of the light source at a first image point located between the first transmission grating and the measurement reflector, in an xz-plane defined by the first direction and the at least one measurement direction, so that a beam which diverges in the xz-plane impinges on the first deflection grating;
  the first deflection grating is configured to collimate the beam incident thereon in the xz-plane, cause the beam to undergo a deflection in an xy-plane defined by the first direction and a second direction perpendicular thereto and focus the beam in an xy-plane to a line focus located centrally in the deflection unit between the first and the second deflection gratings and extending parallel to the at least one measurement direction;
  the second deflection grating is configured to cause the beam incident thereon to undergo a deflection in the xz-plane, form a second image of the light source at a second image point located between the measurement reflector and the second transmission grating in the xz-plane, so that a beam which diverges in the xz-plane impinges on the second transmission grating, and collimate the beam in the xy-plane; and
  the second transmission grating is configured to form an image of the second image point in a detection plane of the detector device.

13. The device as recited in claim 1, wherein the first transmission grating is configured to split off a reference beam which, at the second transmission grating, is brought into interfering superposition with the at least one beam that strikes the measurement reflector twice.

14. The device as recited in claim 1, wherein the transmission gratings are blazed gratings.

15. The device as recited in claim 1, further comprising a downstream machine controller configured to combine the reference signal with incremental distance signals.

16. A device for position determination comprising:
  a light source;
  a planar measurement reflector movable along at least one measurement direction which is oriented perpendicular to the measurement reflector;
  a detector device disposed such that at least one beam emitted by the light source strikes the detector device after impinging on the measurement reflector so that, in an event of a movement of the measurement reflector along the at least one measurement direction, at least one signal results which is dependent on a position of the measurement reflector and from which a reference signal is generatable at a defined reference position; and
  a deflection unit disposed so as to deflect the at least one beam such that the at least one beam strikes the measurement reflector twice, and, in between a first and a second reflection from the measurement reflector, passes through the deflection unit, the deflection unit being arranged so that a deviation in beam direction, resulting after the first reflection from a tilt of the measurement reflector by an angle $\alpha$ about a tilt axis, is compensated after the second reflection using one or more optical components that are designed such that a beam impinging a first time at an angle $\Theta$ to a normal to the measurement reflector in a non-tilted state will impinge a second time on the measurement reflector at an angle $\Theta-2\alpha$ to the normal to the measurement reflector in the non-tilted state after it has passed through the deflection unit,
  wherein the one or more optical components include diffractive optical elements including a first and a second deflection grating.

* * * * *